(12) United States Patent
Wenzel et al.

(10) Patent No.: US 6,364,503 B1
(45) Date of Patent: Apr. 2, 2002

(54) ILLUMINATED MEMORIAL ASSEMBLY

(76) Inventors: Herman J. Wenzel; Christina A. Wenzel, both of 240 Lanza Ave., Saddle Brook, NJ (US) 07663

( * ) Notice: Subject to any disclaimer, the term of this patent is extended or adjusted under 35 U.S.C. 154(b) by 0 days.

(21) Appl. No.: 09/612,112

(22) Filed: Jul. 7, 2000

(51) Int. Cl.[7] .................................................. F21L 4/00
(52) U.S. Cl. ........................ 362/186; 368/363; 368/276; 368/806; 368/367; 368/121; 368/153
(58) Field of Search ................................. 362/368, 363, 362/276, 806, 183, 367, 121, 153, 186

(56) References Cited

U.S. PATENT DOCUMENTS

| | | | |
|---|---|---|---|
| 4,384,317 A | | 5/1983 | Stackpole |
| 5,013,972 A | | 5/1991 | Malkieli et al. |
| D319,703 S | * | 9/1991 | Hazerjian et al. ............. D26/67 |
| 5,155,668 A | * | 10/1992 | Tanner et al. ................ 362/183 |
| 5,255,170 A | | 10/1993 | Plamp et al. |
| 5,442,532 A | * | 8/1995 | Boulos et al. ............... 362/276 |
| 5,564,816 A | | 10/1996 | Arcadia et al. |
| D378,435 S | | 3/1997 | Trombley |
| 5,633,565 A | | 5/1997 | Friedman et al. |

* cited by examiner

Primary Examiner—Sandra O'Shea
Assistant Examiner—Ali Alavi

(57) ABSTRACT

A illuminated memorial assembly for providing a substantially continual illumination at a memorial site. The illuminated memorial assembly includes a housing. The housing has a bottom portion and a top portion. A plurality of connecting rods connects the top portion to the bottom portion in a spaced relationship. Each of the rods is elongate and has a first end and a second end. Each of the first ends is coupled to the top portion, and each of the second ends is removably coupled to the bottom portion. A light assembly includes a light bulb. The light bulb is mounted in a light socket, which is mounted on a top surface of the bottom portion. A power source comprises a battery. The battery is mounted in the bottom portion and is operationally coupled to the light socket.

17 Claims, 3 Drawing Sheets

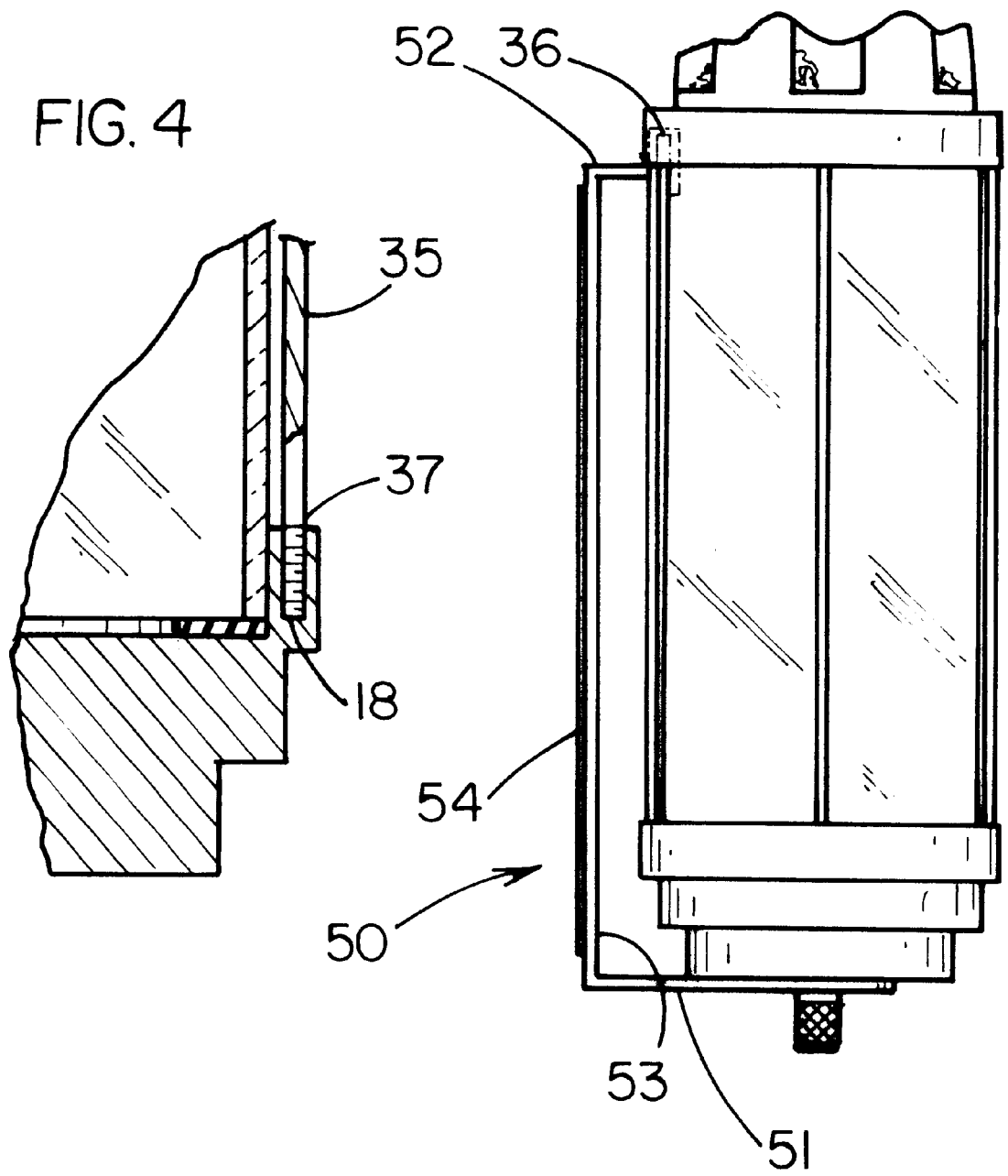

ILLUMINATED MEMORIAL ASSEMBLY

BACKGROUND OF THE INVENTION

1. Field of the Invention

The present invention relates to memorial assemblies and more particularly pertains to a new illuminated memorial assembly for providing a substantially continual illumination at a memorial site.

2. Description of the Prior Art

The use of memorial assemblies is known in the prior art. More specifically, memorial assemblies heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,564,816; 5,255,170; 5,013,972; 5,633,565; 4,384,317; and U.S. Pat. No. Des. 378,435.

While these devices fulfill their respective, particular objectives and requirements, the aforementioned patents do not disclose a new illuminated memorial assembly. The inventive device includes a housing. The housing has a bottom portion and a top portion. A plurality of connecting rods connects the top portion to the bottom portion in a spaced relationship. Each of the rods is elongate and has a first end and a second end. Each of the first ends is coupled to the top portion, and each of the second ends is removably coupled to the bottom portion. A light assembly includes a light bulb. The light bulb is mounted in a light socket, which is mounted on a top surface of the bottom portion. A power source comprises a battery. The battery is mounted in the bottom portion and is operationally coupled to the light socket.

In these respects, the illuminated memorial assembly according to the present invention substantially departs from the conventional concepts and designs of the prior art, and in so doing provides an apparatus primarily developed for the purpose of providing a substantially continual illumination at a memorial site.

SUMMARY OF THE INVENTION

In view of the foregoing disadvantages inherent in the known types of memorial assemblies now present in the prior art, the present invention provides a new illuminated memorial assembly construction wherein the same can be utilized for providing a substantially continual illumination at a memorial site.

The general purpose of the present invention, which will be described subsequently in greater detail, is to provide a new illuminated memorial assembly apparatus and method which has many of the advantages of the memorial assemblies mentioned heretofore and many novel features that result in a new illuminated memorial assembly which is not anticipated, rendered obvious, suggested, or even implied by any of the prior art memorial assemblies, either alone or in any combination thereof.

To attain this, the present invention generally comprises a housing. The housing has a bottom portion and a top portion. A plurality of connecting rods connects the top portion to the bottom portion in a spaced relationship. Each of the rods is elongate and has a first end and a second end. Each of the first ends is coupled to the top portion, and each of the second ends is removably coupled to the bottom portion. A light assembly includes a light bulb. The light bulb is mounted in a light socket, which is mounted on a top surface of the bottom portion. A power source comprises a battery. The battery is mounted in the bottom portion and is operationally coupled to the light socket.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new illuminated memorial assembly apparatus and method which has many of the advantages of the memorial assemblies mentioned heretofore and many novel features that result in a new illuminated memorial assembly which is not anticipated, rendered obvious, suggested, or even implied by any of the prior art memorial assemblies, either alone or in any combination thereof.

It is another object of the present invention to provide a new illuminated memorial assembly which may be easily and efficiently manufactured and marketed.

It is a further object of the present invention to provide a new illuminated memorial assembly which is of a durable and reliable construction.

An even further object of the present invention is to provide a new illuminated memorial assembly which is susceptible of a low cost of manufacture with regard to both materials and labor, and which accordingly is then susceptible of low prices of sale to the consuming public, thereby making such illuminated memorial assembly economically available to the buying public.

Still yet another object of the present invention is to provide a new illuminated memorial assembly which provides in the apparatuses and methods of the prior art some of the advantages thereof, while simultaneously overcoming some of the disadvantages normally associated therewith.

Still another object of the present invention is to provide a new illuminated memorial assembly for providing a substantially continual illumination at a memorial site.

Yet another object of the present invention is to provide a new illuminated memorial assembly which includes a housing. The housing has a bottom portion and a top portion. A plurality of connecting rods connects the top portion to the bottom portion in a spaced relationship. Each of the rods is elongate and has a first end and a second end. Each of the first ends is coupled to the top portion, and each of the second ends is removably coupled to the bottom portion. A light assembly includes a light bulb. The light bulb is mounted in a light socket, which is mounted on a top surface of the bottom portion. A power source comprises a battery. The battery is mounted in the bottom portion and is operationally coupled to the light socket.

Still yet another object of the present invention is to provide a new illuminated memorial assembly that utilizes solar energy for allowing the continued power supply for the light.

Yet another object of the present invention is to provide a new illuminated memorial assembly that replaces the need to daily change candles in traditional illuminated memorial assemblies.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a schematic side cross-sectional view of the bottom portion of the present invention.

FIG. 5 is a schematic side view of the present invention.

DESCRIPTION OF THE PREFERRED EMBODIMENT

Figure 1:
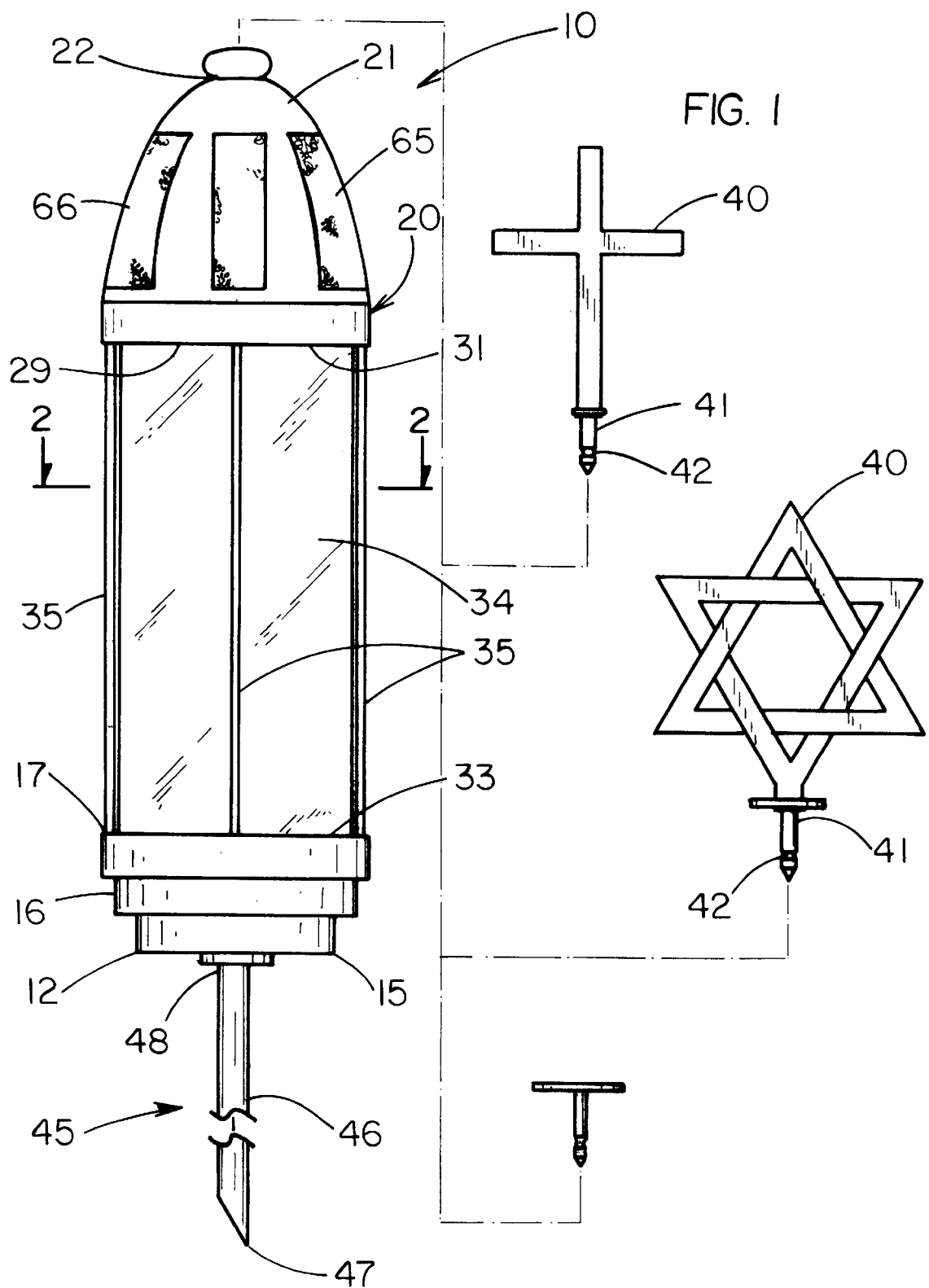
FIG. 1 is a schematic side view of a new illuminated memorial assembly according to the present invention.
Figure 2:
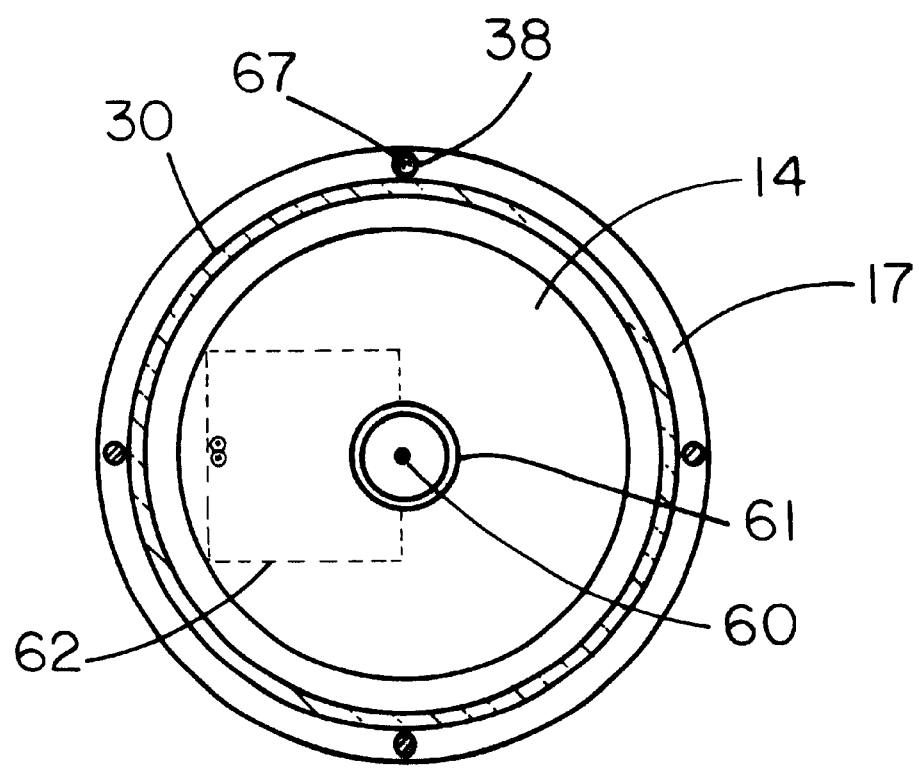
FIG. 2 is a schematic cross-sectional view taken along line 2—2 of the present invention.

With reference now to the drawings, and in particular to FIGS. 1 through 5 thereof, a new illuminated memorial assembly embodying the principles and concepts of the present invention and generally designated by the reference numeral 10 will be described.

As best illustrated in FIGS. 1 through 5, the illuminated memorial assembly 10 generally comprises a housing. The housing comprises a bottom portion 12, a top portion 20, a middle portion 30 and a plurality of connecting rods 35.

The bottom portion 12 has a bottom wall 14. The bottom wall 14 has a peripheral edge 15. A peripheral wall 16 extends upwardly from and is integrally coupled to the peripheral edge 15 of the bottom wall 14. The peripheral wall 16 has a top edge 17. The peripheral wall 16 has a stepped external surface such that the bottom portion 12 comprises a plurality of annular shoulders. A diameter of the top edge 17 is greater than a diameter of the bottom wall 14.

Figure 3:
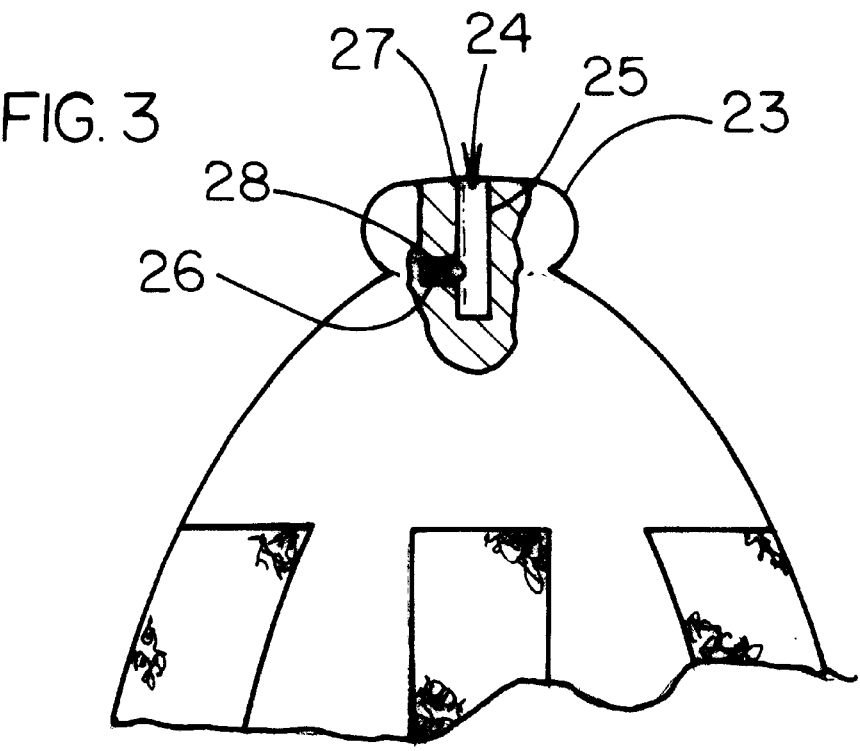
FIG. 3 is a schematic side and broken view of the top portion of the present invention.

The top portion 20 has a generally domed shape. The top portion 20 has an external surface 21. The top portion 20 has an apex 22 having a nub 23 thereon. The nub 23 has an aperture 24 therein. The aperture 24 has a side wall 25. A bore 26 extends into the side wall 25 of the aperture 24. A bearing 27 is slidably mounted in the bore 26. A biasing means 28 biases the bearing 27 into the aperture 24 such that a portion of the bearing 27 extends into the aperture 24 as shown in FIG. 3. The top portion 20 has a free edge 29 having a diameter substantially equal to a diameter of the top edge 17 of the bottom portion 12.

The plurality of connecting rods 35 connect the top portion 20 to the bottom portion 12 in a spaced relationship. Each of the rods 35 is elongate and has a first end 36 and a second end 37. Each of the first ends 36 extends into and is fixedly coupled to the free edge 29 of the top portion 20. Each of the second ends 37 is threaded, and each of the second ends is removably insertable in bores 18 in the top edge 17 of the bottom portion 12. The bores 18 are threaded such that the connecting rods 35 may be screwed into them. The plurality of connecting rods 35 is ideally four connecting rods. The connecting rods 35 are preferably spaced. A first 38 of the connecting rods is generally hollow.

The middle portion 30 has a top edge 31 and a bottom edge 33 integrally coupled together by a peripheral wall 34. The middle portion 30 has a generally cylindrical shape. The middle portion 30 has a diameter such that the middle portion 30 may be positioned on the bottom portion 12, wherein the connecting rods 35 are positioned outside of the middle portion 30. The middle portion 30 preferably comprises a generally translucent material. The translucent material is preferably glass or a plastic. The middle portion 30 is ideally colored. The color may be selected from the group consisting of red, blue, green, purple and yellow.

An ornament 40 may be positioned in the aperture 24 of the top portion 20. The ornament 40 has a post 41 integrally coupled thereto. The post 41 is removably insertable in the aperture 24. The post 41 has an annular notch 42 therein for communicating with the bearing 27. When inserted in the aperture 24, the annular notch 42 slides past the bearing 27 and the bearing 27 enters the annular notch 42 to help secure the post 41 in the aperture 24. The ornaments 40 are preferably religious symbols such as cross or the Star of David.

A mounting means 45 mounts the housing 10 over the ground. The mounting means 45 comprises an elongate member 46 for positioning the housing 10 over a ground surface. The elongate member 46 has a first end 47 and a second end 48. The first end 47 is generally pointed. The second end 48 is coupled to a bottom surface of the bottom wall 14. In another embodiment, shown in FIG. 5, the mounting means comprises a bracket 50. The bracket comprises a first leg 51 and a second leg 52 integrally combined together by an elongate member 53. Each of the legs 51, 52 is coupled to one of the top 20 and bottom 12 portions such that the elongate member 53 is orientated generally parallel to the connector rods 35. The elongate member 53 has an outside surface positioned opposite of the housing. The outside surface has a conventional adhesive material 54 thereon. The bracket 50 may be fastened to a surface using the adhesive material.

A light assembly comprises a light bulb 60, light socket 61 and power source. The light bulb 60 is mounted in the light socket 61. The light socket 61 is mounted on a top surface of the bottom wall 14. The power source, not shown, comprises a battery. Ideally, the battery comprises a rechargeable battery. The battery is mounted in the bottom wall 14 of the bottom portion 12. A removable door 62 covers the battery. The power source is operationally coupled to the light socket 61.

Preferably, each of a plurality of solar panels 65 is fixedly coupled to the exterior surface 21 of the top portion 20. Each of the solar panels 65 is operationally coupled to the battery such that the solar panels 65 may recharge the battery. The solar panels 65 are conventional solar panels.

A conventional light sensitive switch 66 is fixedly mounted to an exterior 21 of the top portion 20 and replaces one of the solar panels 65. The light sensitive switch 66 is adapted to turn on the light bulb 60 when ambient light decreases. The light sensitive switch 66 is operationally coupled to the light socket 61. This feature preserves power during daylight when the light would not be visible.

In use, the device is typically mounted in the ground using the mounting means 45 in a location generally adjacent to a gravesite or other memorial site. The light bulb 60 within the housing is preferably a low watt bulb of the flickering type to simulate a candle. The battery supplies power to the light bulb. The solar panels 65 recharge the battery. Preferably the wires 67 from the solar panels 65 to the battery are positioned in the hollow connecting rod 38. The connecting rods 35 may be removed for replacement of batteries or to change the middle section 30 of the housing to another color.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. An illuminated memorial assembly, said assembly comprising:
   a housing comprising;
      a bottom portion;
      a top portion;
      a plurality of connecting rods for connecting said top portion to said bottom portion in a spaced relationship, each of said rods being elongate and having a first end and a second end, each of said first ends being coupled to said top portion, each of said second ends removably coupled to said bottom portion;
   a light assembly comprising:
      a light being mounted in a light socket, said light socket being mounted on a top surface of said bottom portion; and
      a power source comprising a battery, said power source being operationally coupled to said light socket;
   a mounting means for mounting said housing, said mounting means comprising a bracket including an elongate member and a first leg and a second leg connected to said elongate member, each of said legs being coupled to one of said top and bottom portions such that said elongate member is oriented generally parallel to said connector rods, said elongate member having an outside surface positioned opposite of said housing, said outside surface having an adhesive material thereon for fastened said bracket to a surface.

2. The illuminated memorial assembly as in claim 1, further comprising:
   a middle portion, said middle portion having a generally cylindrical shape, said middle portion having a diameter such that said middle portion may be positioned on said bottom portion such that said connecting rods are positioned outside of said middle portion, said middle portion comprising a generally translucent material.

3. The illuminated memorial assembly as in claim 1, wherein said bottom portion has a bottom wall, said bottom wall having a peripheral edge, a peripheral wall extending upwardly from and integrally coupled to said peripheral edge of said bottom wall, said peripheral wall having a top edge, said top edge having bores therein for receiving said second ends of said connecting rods, said battery being housed in said bottom wall.

4. The illuminated memorial assembly as in claim 3, wherein said top portion has a generally domed shape, said top portion having an external surface, said top portion having an apex having a nub thereon, said nub having an aperture therein, said top portion having a free edge having a diameter substantially equal to a diameter of said top edge of said bottom portion; and an ornament for positioning in said aperture of said top portion, said ornament having a post integrally coupled thereto, said post being removably insertable in said aperture.

5. The illuminated memorial assembly as in claim 1, further comprising:
   a mounting means for mounting said housing, said mounting comprising an elongate member for positioning said housing over a ground surface, said elongate member having a first end and a second end, said first end being generally pointed, said second end being coupled to a bottom surface of said bottom portion.

6. The illuminated memorial assembly as in claim 2, further comprising:
   a mounting means for mounting said housing, said mounting comprising an elongate member for positioning said housing over a ground surface, said elongate member having a first end and a second end, said first end being generally pointed, said second end being coupled to a bottom surface of said bottom portion.

7. An illuminated memorial assembly comprising:
   a housing comprising;
      a bottom portion;
      a top portion;
      a plurality of connecting rods for connecting said top portion to said bottom portion in a spaced relationship, each of said rods being elongate and having a first end and a second end, each of said first ends being coupled to said top portion, each of said second ends removably coupled to said bottom portion;
   a light assembly comprising:
      a light being mounted in a light socket, said light socket being mounted on a top surface of said bottom portion; and a power source comprising a battery operationally coupled to said light socket;

a middle portion having a generally cylindrical shape, said middle portion having a diameter such that said middle portion may be positioned on said bottom portion such that said connecting rods are positioned outside of said middle portion, said middle portion comprising a generally translucent material; and a mounting means for mounting said housing, said mounting means comprising a bracket, said bracket comprising first leg and a second leg integrally combined together by an elongate member, each of said legs being coupled to one of said top and bottom portions such that said elongate member is orientated generally parallel to said connector rods, said elongate member having an outside surface positioned opposite of said housing, said outside surface having an adhesive material thereon, wherein said bracket may be fastened to a surface.

8. The illuminated memorial assembly as in claim 1, wherein said light assembly further comprises a rechargeable battery; and said light assembly further comprises a plurality of solar panels, each of said solar panels being fixedly coupled to a top exterior surface of said top portion, each of said solar panels being operationally coupled to said battery, such that said solar panels may recharge said battery.

9. The illuminated memorial assembly as in claim 1, wherein said light assembly further comprises:

a light sensitive switch, said light sensitive switch being fixedly mounted to an exterior of said top portion, said light sensitive switch being adapted to permit the flow of power to said light socket when ambient light decreases, said light sensitive switch being operationally coupled to said light socket.

10. An illuminated memorial assembly, said assembly comprising:

a housing comprising;
a bottom portion;
a top portion;
a plurality of connecting rods for connecting said top portion to said bottom portion in a spaced relationship, each of said rods being elongate and having a first end and a second end, each of said first ends being coupled to said top portion;

a light assembly comprising:
a light socket for removably receiving a light, said light socket being mounted on said bottom portion;

wherein each of said second ends of said connecting rods being removably coupled to said bottom portion for permitting removal of said connecting rods and said top portion from said bottom portion for replacement of a light mounted on said light socket;

a mounting means for mounting said housing, said mounting means comprising a bracket including an elongate member and a first leg and a second leg connected to said elongate member, each of said legs being coupled to one of said top and bottom portions such that said elongate member is oriented generally parallel to said connector rods, said elongate member having an outside surface positioned opposite of said housing, said outside surface having an adhesive material thereon for fastened said bracket to a surface.

11. The illuminated memorial assembly as in claim 10, further comprising a middle portion having a generally cylindrical shape, said middle portion having a diameter such that said middle portion may be positioned on said bottom portion with said connecting rods being positioned outside of said middle portion, said middle portion comprising a generally translucent material.

12. The illuminated memorial assembly as in claim 10, wherein said bottom portion has bores therein for receiving said second ends of said connecting rods.

13. The illuminated memorial assembly as in claim 10, wherein said light assembly includes a rechargeable battery and a plurality of solar panels, each of said solar panels being coupled to a top exterior surface of said top portion, each of said solar panels being operationally coupled to said battery, such that said solar panels may recharge said battery.

14. The illuminated memorial assembly as in claim 10, additionally comprising an ornament for removably mounting on said top portion of said housing.

15. The illuminated memorial assembly as in claim 14, wherein a channel is formed in the top portion of said housing, and said ornament includes a post for removably inserting into said channel.

16. The illuminated memorial assembly as in claim 15, wherein the post of said ornament has an annular groove formed therein, and the channel in said top portion has a detent ball mounted on a wall of said channel, said detent ball being positioned in a bore in the wall of said channel, said detent ball being biased to extend into said channel for engaging the annular groove of said post when said post is inserted into said channel, said detent ball being depressible out of said channel and into said bore.

17. The illuminated memorial assembly as in claim 10, wherein said light assembly further comprises a light sensitive switch mounted on said top portion, said light sensitive switch being adapted to permit the flow of power to said light socket when ambient light decreases, said light sensitive switch being operationally coupled to said light socket.

* * * * *